Jan. 9, 1923. Re. 15,521.

A. L. McGREGOR.

AUTOMOBILE BUMPER.

ORIGINAL FILED DEC. 7, 1920.

Inventor
Allan L. McGregor,
By Hull, Brock & West,
Attys.

Reissued Jan. 9, 1923. Re. 15,521

UNITED STATES PATENT OFFICE.

ALLAN L. McGREGOR, OF CHICAGO, ILLINOIS.

AUTOMOBILE BUMPER.

Original No. 1,361,600, dated December 7, 1920, Serial No. 378,386, filed May 3, 1920. Application for reissue filed November 23, 1922. Serial No. 602,957.

*To all whom it may concern:*

Be it known that I, ALLAN L. McGREGOR, a citizen of the United States, residing at Chicago, in the county of Cook and State of Illinois, have invented a certain new and useful Improvement in Automobile Bumpers, of which the following is a full, clear, and exact description, reference being had to the accompanying drawings.

This invention relates to improvements in automobile bumpers and more particularly to those devices which are attached to the frame of a motor vehicle for the purpose of protecting the vehicle from damage in the event of collision with other vehicles or obstacles.

The object of the present invention is to provide an improved construction having among other features a degree of adjustability which will permit the bumper to be attached to various makes of vehicles having different dimensions between the points or places of attachment, and moreover providing a suitable degree of movement between the bumper parts, thereby making the structure more flexible and better capable of withstanding the shocks of impact without being permanently distorted.

Figure 1:
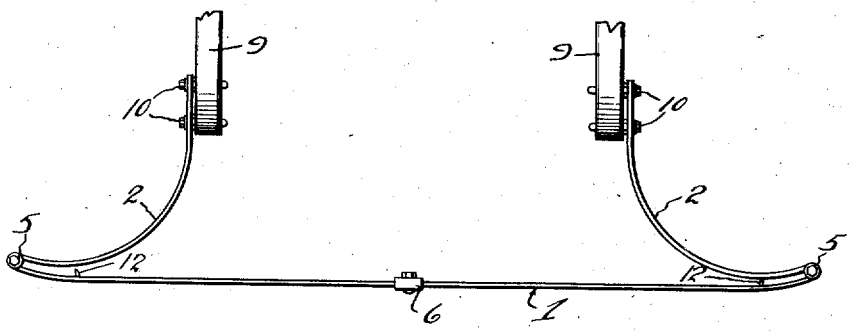
Figure 2:
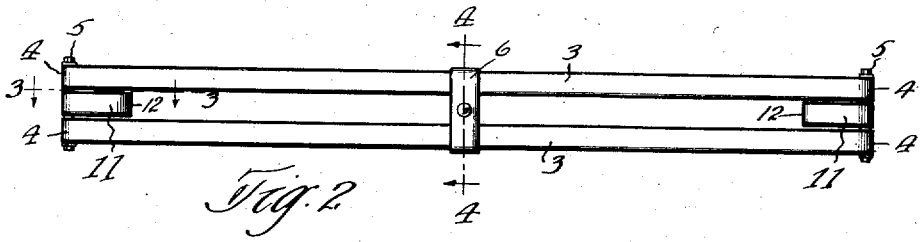
Figure 3:
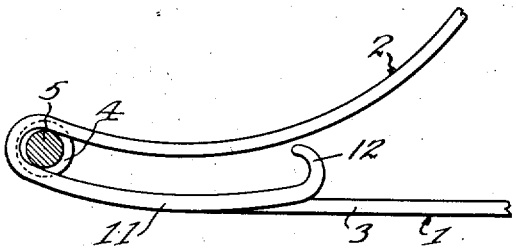
Figure 4:
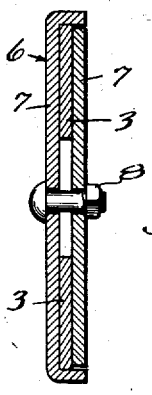

The structural features of the bumper are hereinafter fully described in connection with the accompanying drawings, in which Fig. 1 is a top plan view of the bumper as attached to the vehicle frame members; Fig. 2 is a view in front elevation of the bumper; Fig. 3 is an enlarged detail view in horizontal section, taken on line 3, 3 of Fig. 2, and Fig. 4 is an enlarged detail view in vertical section, taken on line 4, 4 of Fig. 2.

A preferred structure for a bumper embodying the features of my invention comprises in the main an impact member 1 extending transversely of the vehicle frame and horizontally at a distance outwardly therefrom, and two connecting members or bars 2, 2 adapted for attachment to the vehicle frame and permanently connected to the ends of the impact member 1.

The impact member is inherently flexible, being constructed of two parallel bars 3, 3 of metal bar stock arranged so that they are relatively yieldable in a horizontal direction and relatively nonyieldable in a vertical direction, these bars being spaced apart vertically, the intervening space being substantially equal to the width of each of the bars. The parallel bars 3, 3 are connected together at their ends in the following manner: The ends of each bar are bent or formed to provide circular eyes 4, through which are inserted relatively long bolts 5, 5. The central portions of the bars 3, 3 are further connected together in spaced relation by means of a clip 6 comprising vertically arranged plates 7, 7 which are connected together and clamped in place by means of a centrally disposed bolt 8.

The connecting members or bars 2, 2 hereinbefore mentioned, are formed of similar bar stock, preferably bent in curvilinear conformation throughout a rather large arc, so that the end portions of each bar are arranged at an angle of substantially ninety degrees to each other. The inner end portions of the bars 2, 2 extend parallel to the longitudinal frame members 9, 9 of the vehicle frame and are attached or fixed thereto by means of suitable clamping bolts 10, 10. The outer end portions of the bars 2, 2 extend substantially parallel to the end portions of the impact member 1 and are connected thereto in the following manner: As shown in Fig. 3, the outer end portion of each bar 2, 2 is provided with an end portion 11 formed by bending the end of the bar backwardly upon itself and turning the extremity inwardly toward the main portion of the bar to form a hook 12. The portions of the bar, as thus bent, are spaced apart at a uniform distance, thereby forming an elongated slot of the desired length, said slot being closed at its inner end by means of the hook 12 to form an elongated eye. The attachment of the outer ends of the bars 2, 2 is accomplished by inserting the said ends between the bars 3, 3 of the impact member 1 and passing the bolts 5, 5 through the elongated eyes formed at the ends of the connecting bars as well as the eyes 4 at the ends of the bars 3, 3. The width of the slots is sufficient to permit the bolts to slide longitudinally thereof with ample freedom.

From the description of the structure, it is manifest that the connecting bars 2, 2 may be adjusted relative to the impact member 1, that is to say, they may be moved laterally toward each other or in the opposite direction so that their inner ends may be attached to the vehicle frame members, such as 9, 9, and at the same time allow for varying distances between these frame members, this variation being taken up at the point of connection of the bars 2, 2 with the impact member 1 by the shifting of the bolts 5, 5 within the slots formed in the elongated eyes at the ends of said connecting bars 2, 2. Furthermore, if it is not desired to move the outer ends of the bars 2 in the direction of the length of the impact section in order to accommodate variations in width of vehicle frames, a considerable adjustment for this purpose can be effected by swinging the bars 2 about the bolts 5 as pivots.

In addition to the adjustable feature, which permits the bumper to be attached to various makes of vehicle, an added degree of flexibility is afforded in the structure by reason of the slot-and-bolt connection between the main parts of the bumper, it being manifest that when an object strikes against the impact member the tendency will be for this member to bow inwardly, and likewise the ends to be drawn toward each other, bringing about a movement of the bolts 5, 5 in the slots at the ends of the connecting bars 2, 2. Manifestly this movement is free until the bolt engages the hooked end 12 at the inner extremity of the slot, whereupon the bars 2, 2 themselves would absorb the remaining force of the shock by being bent toward a straight line position.

The features of my invention are hereinafter more fully disclosed in the appended claims.

Having thus described my invention, what I claim is:

1. In an automobile bumper, the combination of an impact member, comprising bars spaced apart vertically and rigidly connected at their ends, and attaching bars adapted to be connected at one of their ends to the vehicle frame members, and provided at their other ends with slotted extremities adapted to adjustably engage the ends of said impact member.

2. In an automobile bumper, the combination of an impact member comprising parallel bars spaced apart vertically and provided with eyes at their ends, and bolts extending through said eyes, and bars connected at one of their ends to a vehicle frame, and bent at their outer ends to provide slots engaging the portions of said bolts intermediate the bars of the impact member.

3. In an automobile bumper, the combination of an impact member comprising parallel bars spaced apart and bolts connecting said bars at their ends, bars connecting the ends of said impact member with a vehicle frame, and provided with outer end portions extending parallel with said impact member and bent double to provide slots engaging said bolts intermediate the bars of said impact member.

4. In an automobile bumper, the combination of an impact member comprising parallel bars provided with eyes at their ends, bolts extending through said eyes, and bars for connecting said impact member to a vehicle frame, having outer end portions bent to form slots extending longitudinally of said impact member, said slotted end portions being located between the bars of said impact member, the bolts thereof passing through the slots.

5. In a vehicle bumper, the combination of an impact member comprising bars spaced apart vertically and connected at their ends, and attaching bars each adapted to be connected at one of its ends to a vehicle frame member and pivotally connected at its opposite end to the adjacent end of the impact member.

6. In an automobile bumper, the combination of an impact member comprising bars spaced apart vertically and connected at their ends, and attaching bars each adapted to be connected at one of its ends to a vehicle frame member and pivotally connected at its other end to and between the adjacent ends of the first mentioned bars.

7. In an automobile bumper, the combination of an impact member comprising bars spaced apart vertically and provided with eyes at their ends, bolts extending through the aligned eyes of said bars, and attaching bars each adapted to be connected at one of its ends to a vehicle frame member and each having at its opposite or outer end an eye adapted to be positioned between the eyes at the adjacent ends of the first mentioned bars and to receive the bolt extending through such eyes.

8. In a vehicle bumper, the combination of an impact member comprising bars spaced apart vertically and connected at their ends, and attaching bars each adapted to be connected at one of its ends to a vehicle frame member and movably connected at its opposite end to the adjacent end of the impact member.

9. In an automobile bumper, the combination of an impact member comprising bars spaced apart vertically and connected at their ends, and attaching bars each adapted to be connected at one of its ends to a vehicle frame member and movably connected at its other end to and between the adjacent ends of the first mentioned bars.

10. In an automobile bumper, the combination of an impact member comprising bars spaced apart vertically and provided with eyes at their ends, bolts extending through the aligned eyes of said bars, and attaching bars each adapted to be connected at one of its ends to a vehicle frame member and each having at its opposite or outer end an elongated eye adapted to be positioned between the eyes, at the adjacent ends of the first mentioned bars and to receive the bolt extending through such eyes.

11. In an automobile bumper, the combination of an impact member comprising bars spaced apart vertically and connected at their ends, attaching bars each adapted to be connected at one end to a vehicle frame member, and means pivotally connecting the opposite end of each attaching bar to an end of the impact member, such connecting means permitting relative adjustment between the impact member and each attaching bar in the direction of the length of said member.

12. In an automobile bumper, the combination of an impact member comprising bars spaced apart vertically and connected at their ends, attaching bars each having an inner end adapted to be connected to a vehicle frame member and its outer portion arranged to extend substantially parallel with the adjacent end portion of the impact member, and means pivotally connecting the outer end of each such attaching bar to an end of the impact member, such connecting means permitting relative adjustment between the impact member and each attaching bar in the direction of the end portion of such member.

In testimony whereof I hereunto affix my signature.

ALLAN L. McGREGOR.